United States Patent
Brooks et al.

(10) Patent No.: US 6,924,903 B2
(45) Date of Patent: Aug. 2, 2005

(54) INTERFACE FOR VOUCHER AND COUPON PRINTING

(75) Inventors: Donald E. Brooks, Ithaca, NY (US);
Richard S. Quaif, Dryden, NY (US);
Bart C. Shuldman, Westport, CT (US)

(73) Assignee: TransAct Technologies Incorporated, Wallingford, CT (US)

( * ) Notice: Subject to any disclaimer, the term of this patent is extended or adjusted under 35 U.S.C. 154(b) by 347 days.

(21) Appl. No.: 10/325,214

(22) Filed: Dec. 20, 2002

(65) Prior Publication Data

US 2004/0120002 A1 Jun. 24, 2004

(51) Int. Cl.$^7$ .............................. G06F 3/12; G06F 13/00
(52) U.S. Cl. ................... 358/1.15; 358/1.14; 358/1.13; 358/1.6
(58) Field of Search ................................. 358/1.15, 1.2, 358/1.1, 1.4, 1.6, 1.9, 1.13, 1.14, 1.18, 2.99, 2.1, 3.32, 538, 539, 401, 403, 437, 448, 462, 470; 710/17, 40, 11; 719/321

(56) References Cited

U.S. PATENT DOCUMENTS

| | | | |
|---|---|---|---|
| 6,327,044 B1 | 12/2001 | Shima | ........................ 358/1.15 |
| 6,647,437 B2 | 11/2003 | Ackerman et al. | ............. 710/14 |
| 2004/0053681 A1 | 3/2004 | Jordan et al. | |

OTHER PUBLICATIONS

U.S. Appl. No. 60/369,097, filed Mar. 29, 2002, Meyerhofer.
U.S. Appl. No. 60/394,568, filed Jul. 9, 2002, Mkrtchyan et al.
U.S. Appl. No. 60/396,862, filed Jul. 18, 2002, Mkrtchyan et al.

Primary Examiner—Douglas Tran
(74) Attorney, Agent, or Firm—Lipsitz & McAllister, LLC

(57) ABSTRACT

An interface is disclosed for driving a printer to print highly secure vouchers and less secure coupons. The printer can reside, for example, in a wagering terminal (e.g., slot machine), ticket machine, point-of-sale terminal or the like. A first driver receives, e.g., from a local controller, data indicative of voucher information to be printed. A second driver receives, e.g., from a central system controller, data indicative of coupon information to be printed. A processor responsive to the first and second drivers generates printer commands in a standard printer format so that the same printer can be used to print vouchers and coupons. Coupons do not have to be processed by the secure (and usually proprietary) hardware and/or software provided by the terminal manufacturer for printing vouchers.

8 Claims, 5 Drawing Sheets

INTERFACE FOR VOUCHER AND COUPON PRINTING

BACKGROUND OF THE INVENTION

The present invention relates generally to printers, and more particularly to an interface for driving a printer in a user terminal. Such printers are particularly well suited for use in gaming machines, vending machines, point-of-sale (POS) terminals, transportation and entertainment ticket machines, and the like.

Ticket printers are useful in a variety of applications. One such application is to print coded tickets or vouchers used in lottery terminals, slot machines and other self-service wagering or transaction (e.g., train, event or airline ticket) apparatus. For purposes of the present disclosure and appended claims, the term "voucher" will be used to mean a printed document, such as a ticket, that has (or potentially has) a meaningful cash value and must be printed using secure technology to prevent counterfeiting. The term "coupon" is used to refer to documents that have at most only a negligible cash value, and which can be printed without the high level of security required for vouchers. It should be appreciated that coupons may be printed using secure technology; however, the level of security will typically be lower than that used in connection with vouchers.

Various printer systems have been proposed for use in self-service terminals, such as for cashless gaming systems used, e.g., at casinos and racetracks. In such systems, a voucher is printed for use by a gaming patron instead of, e.g., tokens, cash, debit cards and credit cards. Such self-service terminals may be controlled, or at least partially controlled, by a Central System Controller (CSC) via a network. The CSC may be situated at the same location as the terminals, or may be remotely located. A remotely located CSC may service different terminal populations at a plurality of facilities (such as different casinos, racetracks, retail lottery establishments, etc.).

A facility that uses the terminals may desire to have the capability for the terminal printers to print items other than the voucher. For example, it may be desired to print coupons for use at the facility. Such coupons may, for example, provide free or discounted food items at the facility. Other types of coupons are also envisioned in order to fulfill e.g., various marketing, advertising, and promotional purposes, such as discounts to future special events, advertising of new products and services, free or discounted parking, hotel room upgrades, travel and entertainment promotions, contest entries, and the like.

In most of the terminals already in the field, there is no way for the facility management to access the printer portion of the terminal to print special coupons that are separate from (and may be unrelated to) the vouchers. In order to provide such a capability, vendors have offered new models of terminals that can print coupons. These new terminals require the use of proprietary software, hardware and/or protocols to enable the terminal printer to print vouchers and coupons. The printing of coupons, when offered, is handled via the secure processing channels used for the vouchers, which vouchers are subject to stricter access control and security requirements. This solution is unacceptable to many facilities because it requires the purchase of new terminals. For a facility that has hundreds of such terminals, such a solution is cost prohibitive.

It would be advantageous to provide a more cost effective way for facilities to print coupons from their terminals. Preferably, such a system would allow present terminals to be used, without the need to replace an existing population of terminals. It would be further advantageous to allow a controller (e.g., a secure controller) that is internal to the terminal (e.g., wagering terminal, POS terminal, or other consumer terminal) to communicate with the terminal printer to print vouchers, while also allowing a CSC, which is external to the terminal, to communicate with the built-in terminal printer to print coupons and other documents.

The present invention provides various printer interface embodiments for use with existing and future terminals, which embodiments enjoy the above and other advantages.

SUMMARY OF THE INVENTION

In accordance with the present invention, an interface is provided for driving a printer. A first driver receives, from a local controller, data indicative of information to be printed. A second driver receives, from a central system controller, data indicative of information to be printed. A processor responsive to the first and second drivers generates printer commands in a standard format for the printer.

In one embodiment, the first driver receives data in a first format, and the second driver receives data in a second format. For example, the first driver might receive data in one of an RS-232, Netplex, USB or I2C format, with the second driver receiving data in another one of the RS-232, Netplex, USB or I2C formats.

The first driver and the processor together decode data from the local controller and convert the decoded local controller data to the standard format. The second driver and the processor together decode data from the central system controller and convert the decoded central system controller data to the standard format. In an illustrated embodiment, the first driver processes cash data from the local controller for use in printing a voucher. The second driver processes non-cash data from the central system controller for use in printing a coupon.

The interface can be built into the printer. Alternatively, it can be provided external to the printer. The printer can comprise, for example, a gaming machine printer, a point of sale terminal printer, or the like.

A method is disclosed for driving a printer from a local controller and a central system controller. The method comprises monitoring communications from the local and central system controllers. The availability of the printer is determined when a printer communication is received from one of the controllers. If the printer is available, printer data are decoded in one format and converted to a standard printer format for communication to the printer. If the printer is not available, the controller from which the printer communication was received is notified that the printer is busy. Monitoring of the communications is then continued.

If printer communications are simultaneously received from both controllers, preference can be given to the local game controller. Alternatively, preference can be given to the central system controller, depending on the desired system implementation. The printer can comprise, for example, a gaming machine printer or a point of sale terminal printer.

DETAILED DESCRIPTION OF THE INVENTION

The present invention relates to the printing of vouchers and coupons for dispensing to customers. More particularly, the invention relates to an interface for enabling printers to print vouchers in response to commands from a local controller and to print coupons in response to commands from a central system controller. The printer can reside in a customer operated terminal such as a gaming machine (e.g., slot machine or lottery terminal), vending machine, self-service ticket terminal, POS terminal, or the like. In a gaming machine implementation, the local controller can comprise the portion of the gaming machine sometimes referred to as the "game controller." In such an implementation, the system controller can comprise the central system controller that is sometimes referred to as the "game management unit." Typically, the local controller is part of the terminal that provides the customer with the vouchers and coupons, and the central system controller is a remote device that is either in the same facility where the terminals are located, or in a different facility that can be located virtually anywhere.

Various well known standards are mentioned herein for use in communicating signals between different elements of the disclosed embodiments. These include the RS-232, USB, Netplex and I2C standards. RS-232 is a well known standard that provides an interface between data terminal equipment and data communications equipment, in which serial binary data interchange is used. Netplex, a standard developed by International Game Technology of Reno, Nev., USA, provides a multidrop serial communication link between a central system and peripheral devices, and is used to transfer information and allow control of peripherals. Universal Serial Bus (USB) is a connectivity specification developed by the USB Implementers Forum. USB is used to connect peripherals outside a computer in order to eliminate the inconvenience of opening the computer case for installing cards needed for certain devices. I2C, or 2-wire communication, is a form of synchronous serial communication that was developed by Phillips Semiconductor.

Figure 1:
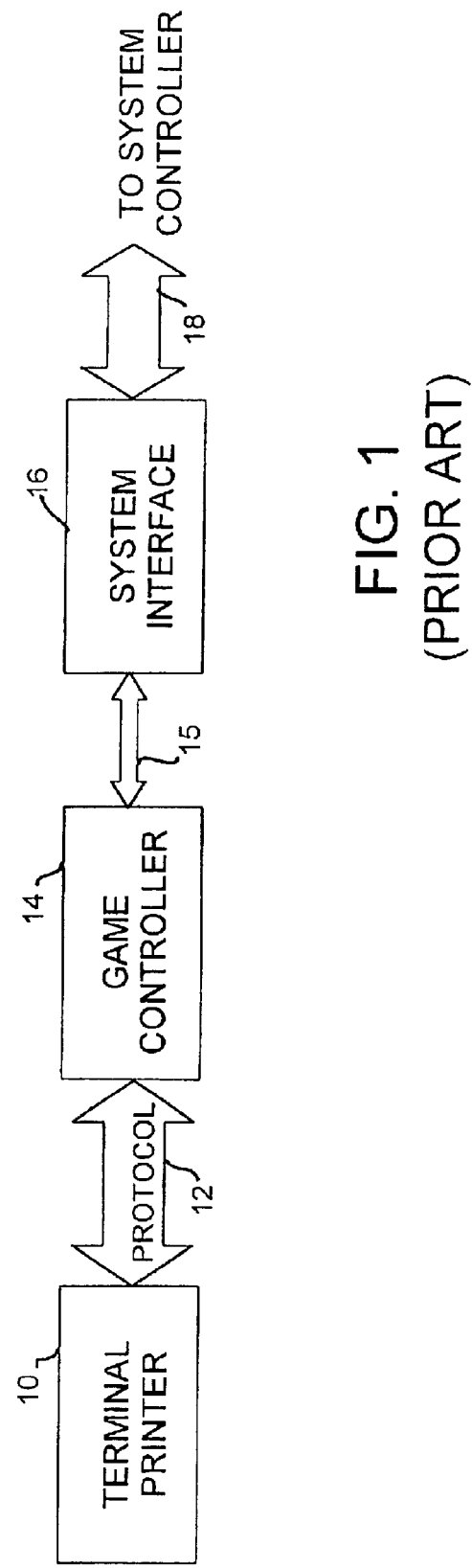
FIG. 1 is a block-diagram of a prior art architecture for controlling the printer in a slot machine.

The interface disclosed herein overcomes the drawbacks of prior art systems that require a proprietary terminal to be purchased to provide both vouchers and coupons. Such a prior art system is shown in FIG. 1, where a terminal printer 10 is provided for printing vouchers and coupons in response to commands from a game controller 14. The game controller 14 provides print commands to printer 10 using a protocol 12 that is compatible with the printer. For example, protocol 12 may comprise one or the other of the R-S232 or Netplex protocols well known in the art of data transmission.

In the prior art embodiment of FIG. 1, the game controller 14 is a proprietary device that is included in the gaming machine. The game controller controls the basic gaming machine hardware, including the printer, coin dispenser, bill acceptor, reels (for a slot machine), etc. and also generates ticket data using a serial number obtained from a central system controller via a system interface 16. The system interface communicates with the central system controller and with the game controller. It obtains the ticket serial numbers from the central system controller and provides these numbers to the game controller. The system interface is also responsible for player tracking, and controls the gaming machine card reader and display.

Each particular manufacturer of such gaming machines will generally have its own game controller technology which is kept secret for security and competitive reasons. Due to the proprietary nature of the game controller which drives the printer, it is not possible for the customer to access the printer directly for the printing of other documents, such as coupons. And, where coupon printing is offered in present day gaming machines, it is only provided via the proprietary game controller, which means the coupons must be generated in association with the gaming machine manufacturer. In particular, where a customer desires a coupon to be printed, the manufacturer of the gaming machine must provide the technology to do so via the game controller 14. This enables the manufacturer to charge additional fees to upgrade current gaming machines, or to require the purchase of new gaming machines with coupon printing capabilities.

At least one gaming machine manufacturer has provided a new model terminal that allows coupon information input at the central system controller to be communicated to the gaming machine system interface 16 via communication path 18. The communication path 18 can comprise, for example, a private network (wired and/or wireless) or the Internet. The system interface 16 will pass the coupon information via path 15 to the proprietary game controller 14, which converts the information as necessary to generate coupon print commands that are provided to the terminal printer 10. Since only the game controller 14 communicates with the printer, there is no way to avoid the use of the proprietary game controller technology to effect the printing of coupons. Thus, the facilities (e.g., casinos) that own the gaming machines are completely dependent on the gaming machine manufacturers to provide the ability to print coupons in addition to the vouchers that the gaming machines are already designed to print.

Figure 2:
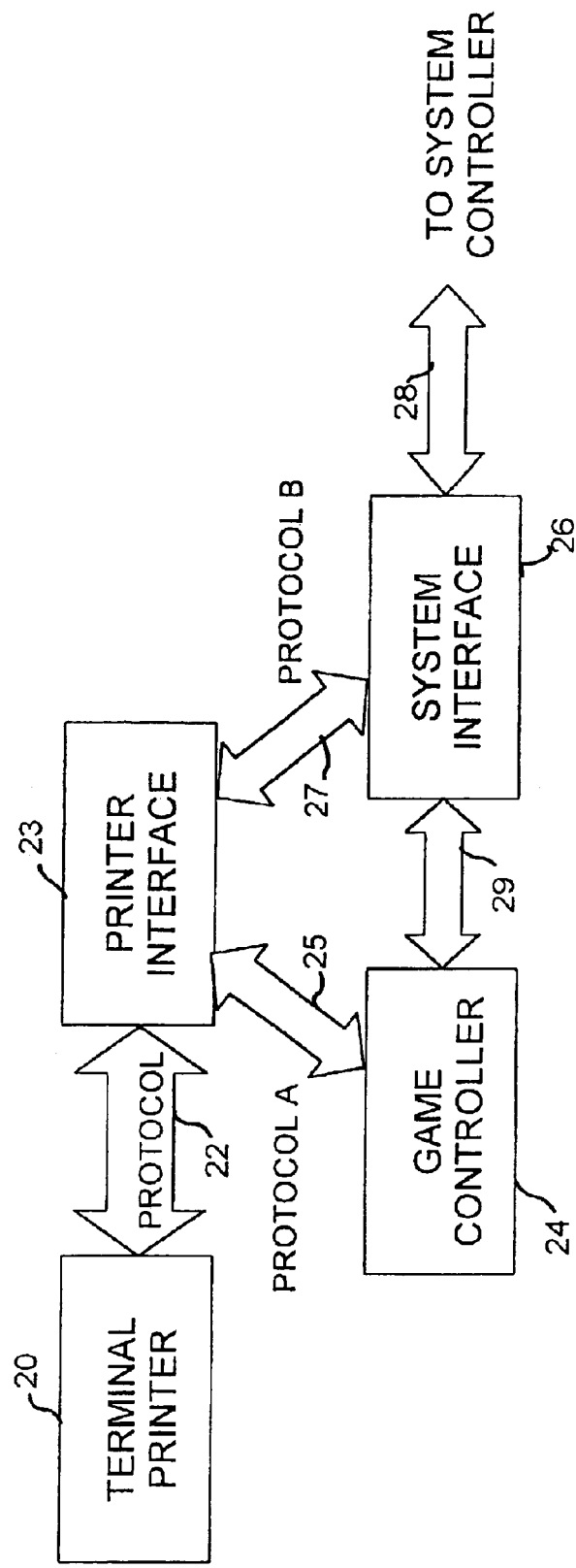
FIG. 2 is a block diagram of a system architecture in accordance with the present invention.

FIG. 2 illustrates an embodiment according to the present invention, wherein coupons can be printed without reliance on the gaming machine manufacturer. In the embodiment of FIG. 2, a printer interface 23 is provided between the system interface 26, game controller 24 and the printer 20. Information from the central system controller (which may optionally include information defining a particular coupon to be printed) is provided to the system interface 26 via communication path 28 (similar to communication path 18). The system interface passes the data received from the central system controller to the game controller 24 in a conventional manner, via path 29 (like path 15 in FIG. 1). The conventional data provided as output from the game controller 24 is communicated to the printer interface 23 via path 25 with the normal protocol used by the game controller, e.g., RS-232 or Netplex ("Protocol A"). The information received from the central system controller is also passed from the system interface 26 directly to the printer interface 23 via path 27, according to a suitable protocol such as I2C ("Protocol B"). It should be understood that any of various different protocols can be used to send the printer information from the system interface 26 to the printer interface 23. In fact, one of the advantages of the present invention is that the communication between the system interface and the printer interface is not a proprietary communication, as is the communication between the game controller and the printer interface. Thus, while Protocol A will be defined by the game machine manufacturer, Protocol B is not so defined. Protocol B can be any protocol that the system interface is capable of communicating with. By providing a generic printer interface 23, the present invention allows coupon information from the central system controller to be printed without passing through and being subject to the processing requirements of the game controller 24.

Once the printer interface 23 receives data from either game controller 24 (e.g., voucher information) or system interface 26 (e.g., coupon information), it determines whether the printer 20 is available, and if so, processes the received data for communication to the printer in a proper format. The properly formatted data is then sent to the printer via path 22, using the protocol (e.g., RS-232) that the printer is designed to receive. The operation of the printer interface is explained in greater detail hereinafter in connection with FIG. 5.

Figure 3:
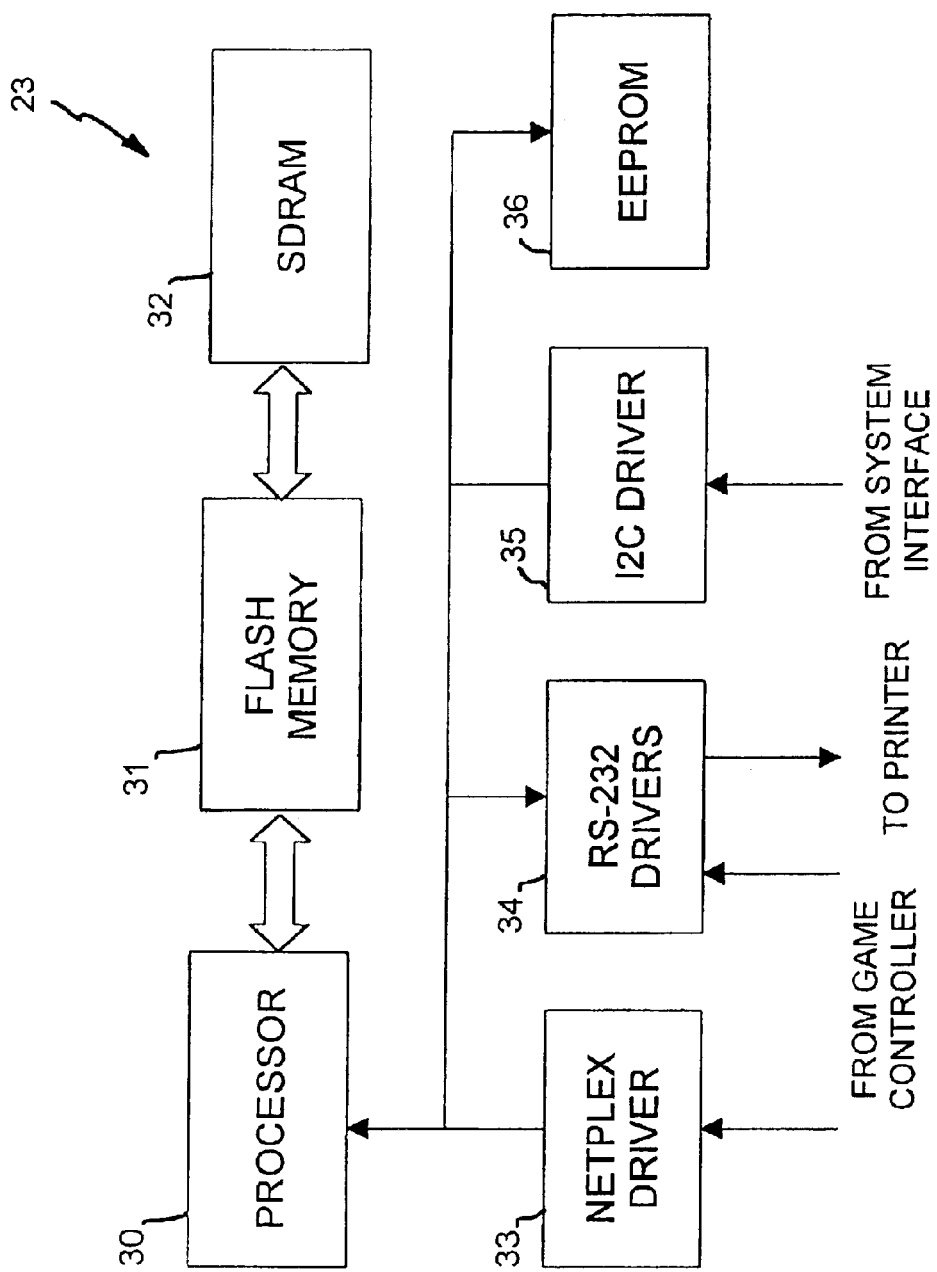
FIG. 3 is a block diagram of an example interface implementation in accordance with the invention.

FIG. 3 is a block diagram illustrating the hardware and software/firmware components of the printer interface 23. A processor 30 processes data received from the game controller 24 and the system interface 26 via respective drivers 33, 34 and/or 35. Driver 33 is, for example, a Netplex driver configured to receive data formatted using the Netplex protocol from the game controller. Such data may comprise, for example, data necessary to print a voucher. Alternatively, the game controller may be configured to provide voucher data using the RS-232 protocol, in which case data will be received by and passed to the processor 30 using RS-232 drivers 34. Coupon data is provided to the processor 30 from the central system controller via the system interface using, e.g., an I2C protocol. The I2C driver 35 processes the coupon data from the system interface and passes it on to the processor 30.

Software and/or firmware that instructs the processor 30 how to decode and convert the data received from the game controller and system interface to the format required by the printer is stored in one or more of EEPROM 36 and flash memory 31. SDRAM 32 is provided for storage of interim values computed by processor 30 as well as other temporary information as well known in the art. Once the voucher or coupon information is decoded and converted to the proper format for printing, it is communicated to the printer via RS-232 drivers 34. Prior to being communicated to the printer, the print data can be temporarily stored in SDRAM 32.

Figure 4:
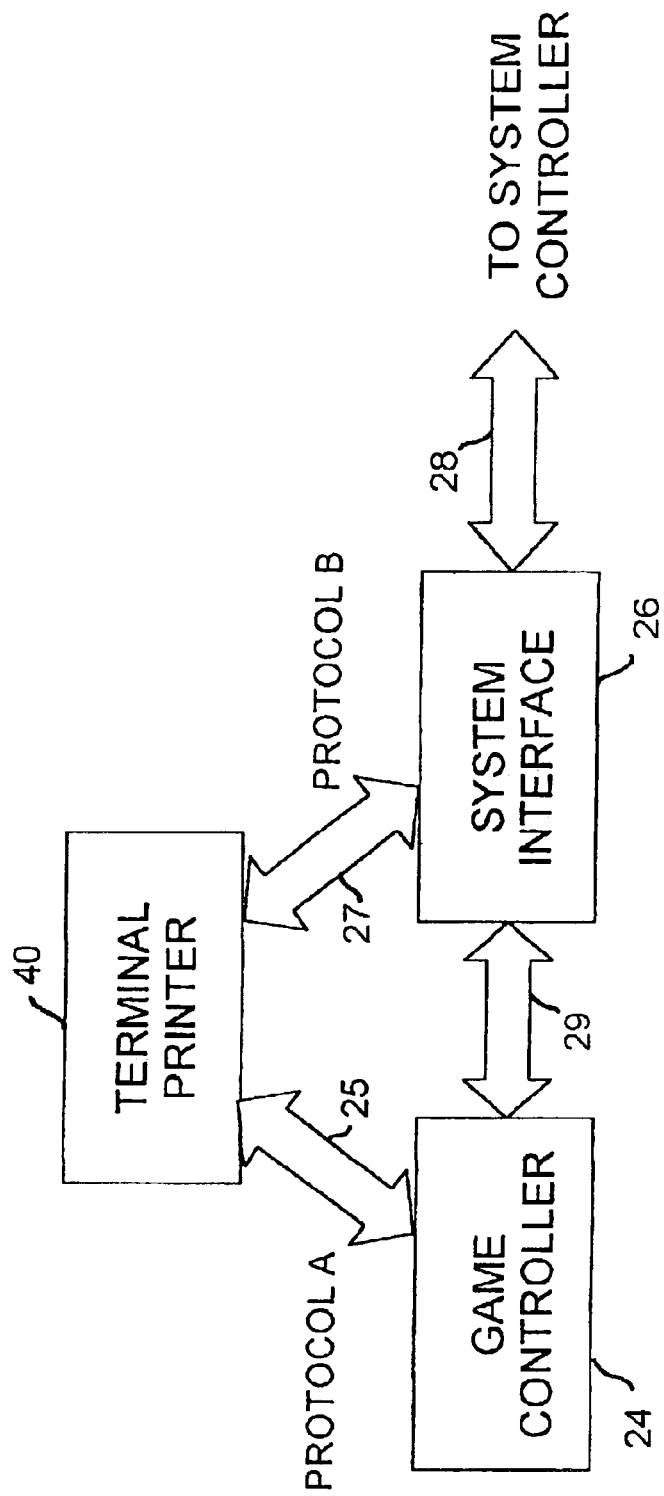
FIG. 4 is a block diagram of an another system architecture embodiment in accordance with the invention.

FIG. 4 is a block diagram of an alternate embodiment where the printer interface 23 is incorporated within the terminal printer. In particular, all of the elements illustrated in FIG. 3 can be built into terminal printer 40. Such an embodiment is an economical alternative to providing a separate printer interface as shown in FIG. 2, since the printer controller already present in the printer can provide many (if not all) of the functionality provided by printer interface processor 30. Memory already present in the printer can also be shared to accommodate the needs of the printer interface. Such an implementation eliminates the need for two separate processors and additional memory.

As shown in FIG. 4, all communications between the game controller and system interface discussed in connection with FIG. 2 are now passed directly to the terminal printer 40. The functions of printer interface 23 and communication path 22 will be performed by equivalent elements that are integrated with the printer 40 itself.

Figure 5:
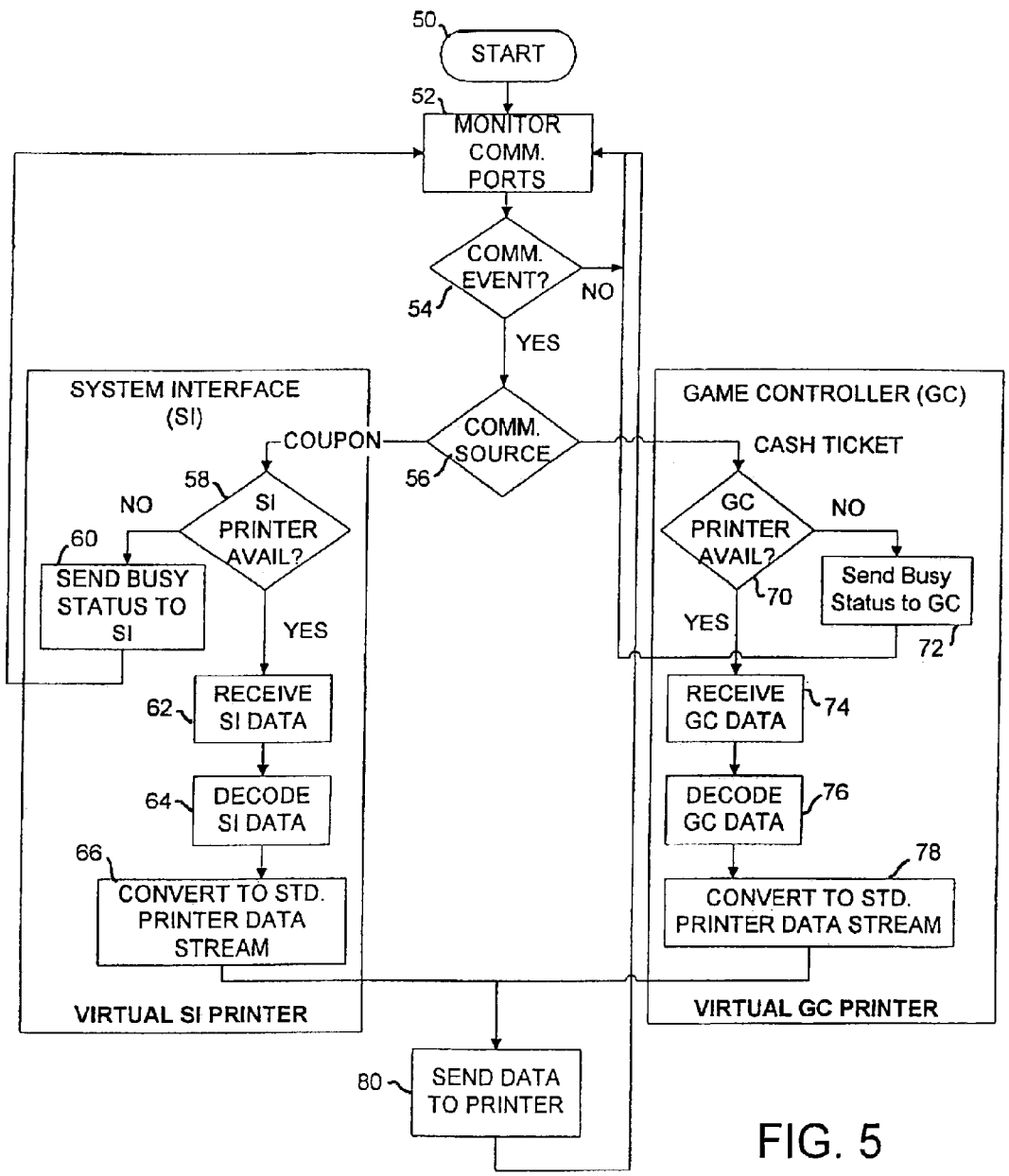
FIG. 5 is a flowchart illustrating an example communication flow that can be implemented in order to carry out the present invention.

FIG. 5 is a flowchart illustrating the communication flow for the printer interface. It is noted that the communication flow illustrated is an example of one possible implementation of the printer interface, and that other implementations are possible and within the intended scope of the invention.

The routine of FIG. 5 starts at box 50. At box 52, the communication ports from the game controller and system interface are monitored for a communication event. For example, in the embodiment shown in FIG. 2, the printer interface 23 monitors communications from the game controller 24 via path 25. Similarly, communications from the system interface 26 are monitored via path 27. If a communication event (e.g., a message for the printer) is detected at box 54, the communication source (game controller or system interface) will be determined at box 56.

Upon determining that a printer message has arrived from the system interface, the message is directed from box 56 to box 58, where a determination is made as to whether the printer is available to print a coupon received from the central system controller. If not, a busy status signal is sent to the system interface so that it can send the message again later (box 60). The routine then continues to monitor the communication ports as indicated at box 52.

If it is determined at box 58 that the printer is available to print a coupon, the coupon data from the system interface is received (box 62), decoded (box 64), and converted to a standard printer data stream (box 66). The standard printer data stream is formatted for the particular printer that is going to print the coupon (e.g., terminal printer 20 of FIG. 2 or terminal printer 40 of FIG. 4). Although different printers can be provided to print coupons and vouchers, the preferred embodiment is to use the same printer for both. After the coupon information is converted to the standard printer data stream as indicated at box 66, it is forwarded to the printer for printing of the coupon (box 80). The routine then returns to box 52, where the communication ports continue to be monitored.

In the event that a communication event is detected from the game controller, this fact is determined at boxes 54 and 56, and at box 70 a determination is made as to whether the printer is available to print a voucher. If not, a busy status is sent to the game controller (box 72) and the routine returns to box 52 for continued monitoring of the communication ports. If the printer is determined to be available at box 70, the game controller data is received at box 74, decoded at box 76, and converted to a standard printer data stream at box 78. The standard printer data stream, formatted for the printer, is passed on to the printer for printing of the voucher, as indicated at box 80. The routine then loops back to box 52 for continued monitoring of the communication ports.

The standard printer data stream will be formatted according to the protocol needed by the particular printer used. For example (and as shown in FIG. 3), the printer data stream may be in the RS-232 format. Those skilled in the art will appreciate that other formats can be used, such as I2C, Netplex, or USB. New printer formats can be accommodated as they are developed, by providing the appropriate driver in the printer interface.

It should now be appreciated that the present invention provides an interface for driving a printer. The printer can reside, for example, in a customer terminal of the type described above, or in any other device which provides coupons and vouchers. In an illustrated embodiment, a first driver receives, e.g., from a local controller, data indicative of voucher information to be printed. A second driver receives, e.g., from a central system controller, data indicative of coupon information to be printed. A processor responsive to the first and second drivers generates printer commands in a standard format for the printer. The use of a printer interface in accordance with the invention enables one or more terminal printers to be used for both vouchers and coupons, without requiring the coupons to be processed by the secure (and usually proprietary) hardware and/or software provided by the terminal manufacturer.

Although the invention has been described in connection with various specific embodiments, it should be appreciated that numerous adaptations and modifications may be made thereto without departing from the intended scope of the invention as set forth in the claims.

What is claimed is:

1. An interface for driving a printer, comprising:
   a first driver for receiving, from a local controller, cash data indicative of information to be printed on a voucher;
   a second driver for receiving, from a central system controller, non-cash data indicative of information to be printed on a coupon; and
   a processor responsive to said first and second drivers for generating printer commands in a standard format for said printer.

2. An interface in accordance with claim 1, wherein said first driver receives data in a first format, and said second driver receives data in a second format.

3. An interface in accordance with claim 2, wherein:
   said first driver receives data in one of an RS-232, Netplex, USB or I2C format; and
   said second driver receives data in another one of said RS-232, Netplex, USB or I2C formats.

4. An interface in accordance with claim 1, wherein:
   said first driver and said processor together decode data from said local controller and convert the decoded local controller data to said standard format; and
   said second driver and said processor together decode data from said central system controller and convert the decoded central system controller data to said standard format.

5. An interface in accordance with claim 1, wherein said interface is built into the printer.

6. An interface in accordance with claim 1, wherein said interface is external to the printer.

7. An interface in accordance with claim 1, wherein said printer is a gaming machine printer.

8. An interface in accordance with claim 1, wherein said printer is a point of sale terminal printer.

* * * * *